Nov. 4, 1952 — W. G. LUTTGE — 2,616,091

HAT

Filed July 25, 1944

INVENTOR.
William G. Luttge
BY Carl A. Castellan

Patented Nov. 4, 1952

2,616,091

UNITED STATES PATENT OFFICE 2,616,091

HAT

William G. Luttge, Rockville Centre, N. Y., assignor to American Viscose Corporation, Wilmington, Del., a corporation of Delaware Application July 25, 1944, Serial No. 546,494

5 Claims. (Cl. 2—192)

This invention relates to improved hats.

It is an object of the present invention to produce hats having improved air permeability combined with shape retention and shape recoverability. Further objects and advantages of the invention will be apparent from the drawing and the description hereinafter.

In accordance with the present invention, the hat is formed from an open or loose mesh fabric—woven, knitted or netted—composed of yarns which consist entirely of or comprise a considerable proportion of heat-activatable fibers. The loose mesh fabric is draped over or stretched over a form having the desired shape and then it is subjected to heat to shrink the heat-activatable fibers or more intensely to render them adhesive to bond the fibers in the fabric. Such heating may be accompanied by pressing of the fabric against the contours of the form, thereby positively shaping the fabric into its ultimate form. When the fabric is composed of such heat-activatable fibers that heat effects shrinkage, pressing may be omitted and shaping may be the result of shrinkage to the shape of the form during the heating.

The loose mesh fabrics may contain non-adhesive or non-activatable fibers (by which is meant any that are not shrunk or rendered adhesive by the treatment used in activating the heat-activatable fibers). Any desired proportion of non-adhesive fibers may be used. Preferably, however, a minor proportion only is used so that the yarns contain a predominant amount of potentially adhesive fibers.

The heat-activatable fibers may be composed of a wide variety of materials, and may comprise any material capable of being formed into fibers which have an inherent tackiness upon heating to temperatures below that at which the non-activatable fibers are damaged or rendered tacky and which are non-tacky at room temperature. Examples of the heat-activatable fibers include such thermoplastic fibers or filaments as those of cellulose acetate or other cellulose esters and ethers or mixed esters, such as cellulose acetate propionate or cellulose acetate butyrate, preferably in plasticized condition; also, resins, either permanently thermoplastic or thermosetting but in the thermoplastic state, formed by the polymerization or condensation of various organic compounds such as coumarone, indene or related hydrocarbons, vinyl compounds, styrene, sterols, phenol-aldehyde resins either unmodified or modified with oils, urea-aldehyde resins, sulfonamide-aldehyde resins, polyhydric alcohol-polybasic acid resins, drying oil-modified alkyd resins, resins formed from acrylic acid, its homologues and their derivatives, sulfur-olefine resins, resins formed from dicarboxylicacids and diamines (nylon type); synthetic rubbers and rubber substitutes, herein called "resins," such for example as polymerized butadiene, olefine polysulfides, iso-butylene polymers, chloroprene polymers; and fibers formed from a resin comprising the product of co-polymerizing two or more resins, such, as copolymers of vinyl halide and vinyl acetate, co-polymers of vinyl halide and an acrylic acid derivative; and also a mixture of resins, such as a mixture of vinyl resins and acrylic acid resins or methacrylic acid resins, a mixture of polyolefine resins and phenol-aldehyde resins, or a mixture of two or more resins from the different classes just named. There may be employed also fibers made from rubber latex, crepe rubber, gutta percha, balata, and the like.

Further, the potentially adhesive fibers may be mixtures of the cellulose derivatives with resins or rubber, such as a mixture of cellulose nitrate and an acrylic acid resin, or a mixture of benzyl cellulose and a vinyl resin, or a mixture of ethyl cellulose and shellac.

A preferred class of vinyl resins from which the fibers may be formed are the copolymers of vinyl chloride with vinyl acetate or vinyl cyanide and after-chlorinated copolymers of vinyl chloride and vinyl acetate.

The resins above mentioned may be classified as:

(a) Heat non-convertible resins such as glycol polybasic acid resins, vinyl resins (particularly those of the preferred class above) and the acid type phenolaldehyde resins, and the like.

(b) Heat-convertible or thermosetting resins such for example as glycerol-polybasic acid resins, polyolefine resins, phenol aldehyde resins and the like.

(c) An element-convertible resin (which becomes infusible through the action of certain elements, such as oxygen and sulfur) such for example as glycerol-polybasic acid-drying oils resins and olefine-sulfur resins.

A preferred type of heat-activatable fibers includes those that are stretched at some stage of manufacture, either very shortly after coagulation of the filaments during the initial spinning or by after-stetching, either while plasticized by heat and solvents or by cold-drawing. Cellulose esters, such as cellulose acetate, or vinyl resins, such as the preferred class of vinyl resins just mentioned, or nylons which have been stretched by at least 50% up to 100–200% or even as high as 1,000% in certain cases are of special advantage when it is desired to avoid the pressing of the fabric against the form and it is desired instead to rely upon shrinkage to shape the fabric. When this type of fiber is used, heating to a given temperature depending on the particular material first effects shrinkage but heating to a higher temperature also renders the fibers adhesive.

Among the non-adhesive fibers which may be used are wood pulp fibers, cotton, flax, jute, kapok, silk, and the like, or synthetic fibers or filaments of cellulosic composition, such as a cellulose or regenerated cellulose, cellulose derivatives, such as cellulose esters, mixed cellulose esters, cellulose ethers, mixed cellulose ester-ethers, mixed cellulose ethers, cellulose hydroxy-ethers, cellulose carboxy-ethers, cellulose ether-xanthates, cellulose xanthofatty acids, cellulose thiourethanes; natural and synthetic rubber and derivatives thereof; alginic acid, gelatine, casein; mineral fibers or filaments such as spun glass, asbestos, mineral wool, and the like; fibers or filaments made of natural and synthetic resins which should be of such type that they are not rendered tacky when the potentially adhesive fibers are rendered tacky by heating; and the fibers made by slitting, cutting or shredding non-fibrous films, such as waste cellophane.

The yarns, when it is desired to produce a fabric having a mixture of potentially adhesive and non-adhesive fibers, are produced by mixing the two types of fibers upon a picker or card and then drafting and spinning. Besides mixing staple fibers of relatively short lengths, the yarns may be formed of continuous filaments some or all of which are activatable by heat. The mixing of the continuous filaments of non-adhesive nature with those which are heat-activatable may be performed at the initial stage of filament formation when it is a matter of artificially producing the filaments. Alternatively, natural or artificial filaments of non-adhesive nature may be combined with natural or artificial continuous filaments of heat-activatable nature by withdrawing untwisted filaments of the two types from suitable packages therein and winding and twisting them simultaneously upon a third common package.

In its simplest form, the entire hat body may be made from a single piece of flat loose mesh fabric by placing it over a mold of the desired shape upon which it is subjected to heat. A knitted fabric is preferred because of its inherent elasticity which permits it to be stretched over the form. Heating may be effected by heating the mold internally, or by directing a blast of heated fluid, such as steam or dry hot air, over the fabric as it rests upon the mold. The former method is preferred when it is desired to press the fabric upon the mold whereas the latter method is preferable when it is desired to rely upon the shrinkage of the fabric to the shape of the mold for forming it. It is to be understood, however, that these methods are not mutually exclusive. For example, when it is desired to press the fabric upon the mold, a heated fluid, such as dry hot air, may be blown through the fabric by using a porous or foraminous mold or form and/or a porous or foraminous pressing platen or die.

After heating and pressing or shrinking to shape, the hat may be allowed to cool on the form or a cold blast of air may be blown against it as it rests upon the form, such blast being directed through the foraminous form and platen or, if no pressing die or platen is used, it may be blown on top of the fabric as it rests on the mold or form.

In certain instances, it is preferable to make the hat from several pieces, each of which is cut out approximately to the pattern necessary to give the ultimate shape of the portion of the hat for which it is intended. Thus a more or less annular piece of fabric may be cut out and used to form the brim of the hat. A separate piece of annular shape may be used to form the side wall and a third piece of generally circular shape may be used to form the top of the crown of the hat. The several pieces before heating may be placed in their respective positions about a form, preferably with adjacent edges slightly overlapping, and then the fabric may be heated and simultaneously shaped to bind fibers therein to set the fabric in the hat shape. Pressure may be applied to the overlapped edges alone by tying a cord or ribbon thereabout or the entire fabric may be pressed against the form during heating. If desired, the several pieces of fabric may be sewed or joined by adhesive before activation and shaping of the fabric, and then the activation may be performed with accompanying shaping either by shrinkage of the fabric pieces alone or by pressing of the form with a suitably shaped platen or by tying with ribbon or cords.

The hat may be finished by trimming, by sewing or adhesively securing a sweat band or liner thereto, and by providing a decorative ribbon or band around the base of the crown. Any other form of decoration such as artificial feathers, flowers, fruits or other ornamentation may be applied, particularly in making ladies' hats.

The extent of activation may be correlated with the proportion of heat-activatable fibers in the fabric to produce any desired stiffness and flexibility. The activation may merely constitute a shinking action in which the fibers and yarns tend to compact themselves and become interlocked by deformation caused by the stresses set up during shrinkage to the final form. Preferably, however, activation to an adhesive or tacky condition is performed and the fibers are bonded together to a predetermined extent. The extent of shrinkage and/or the adhesive bonding can be controlled and the openness or looseness of the mesh of the initial fabric can be selected to produce any desired degree of permeability. Selection of the yarns can be made to produce hats having a wide range of appearance, handle and feel. Thus a lofty yarn comprising 60% of a heat-activatable fiber spun with about 40% of wool yields a hat having a fuzzy appearance and feel in combination with a resilient flexibility so that the hat is characterized by excellent shape retention. On the other hand, a fabric composed of yarns consisting entirely of a heat-activatable fiber can be converted into a hat simulating a straw hat but having improved flexibility and resiliency so that the hat can be deformed and readily restored to shape without injury and without showing evidence of previous deformation. This characteristic particularly distinguishes the hats of the present invention from the straw hats heretofore in common use for summer wear. In addition, the hats of the present invention may be characterized by an openness of mesh and air permeability in conjunction with shape retentivity which have never been obtained in hats heretofore produced. Accordingly, the hats of the present invention are especially advantageous for summer wear in that they are light in weight, of excellent air permeability and of a resilient flexibility associated with shape retention and stability and capability of being restored to shape after deformation in simple fashion without showing evidence of previous deformation.

Referring to the drawing, Figure 1 illustrates a suitable method of producing a hat in accordance with the invention, Figure 2 illustrates a man's hat made in accordance with the invention;

Figure 1:
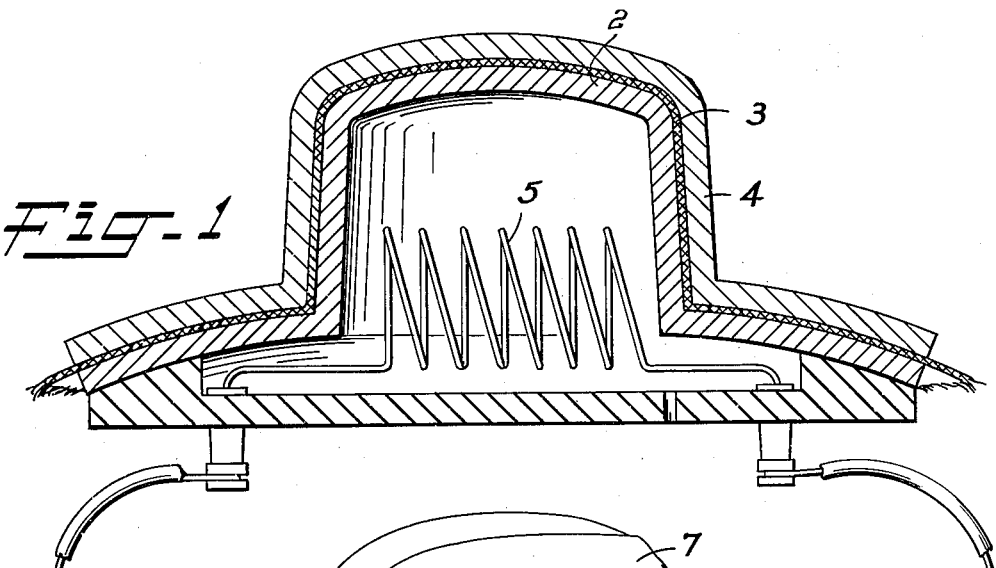
Figure 2:
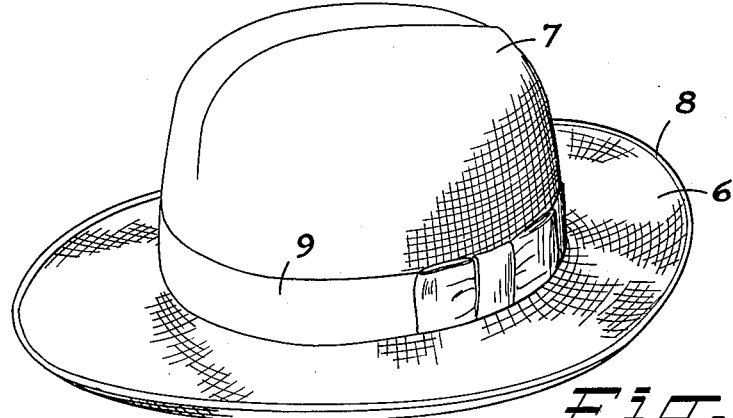

In Figure 1, there is shown a mold or form 2 over which the fabric 3 to be shaped is placed and is pressed by the die 4 to appropriate shape. Either or both of the forming dies 2 and 4 may be heated. As shown, an electric heating coil 5 is provided for heating the form 2. As stated hereinabove, when stretched filaments are present in the fabric so that it is capable of shrinking under the effect of heat, the die 4 may be omitted. In that event, a ribbon or cord may be tied around the base of the crown to assure good contact with the heating surface and to assist shrinkage into shape. Whether shaping occurs with external pressing or as the result merely of shrinkage, the predetermined air permeability is obtained. When shrinkage is mainly relied upon to shape the hat, the porosity or air permeability is reduced to a somewhat greater extent where the greatest amount of shrinkage occurs which in such a hat as shown in Figures 1 and 2 would be adjacent the base of the crown. Where, however, pressure is employed, the yarns can be somewhat stretched by such pressure and in this manner the side wall of the crown can be made of larger mesh and corresponding greater permeability than the top thereof. The extent of air permeability can be controlled by proper selection of the mesh of fabric initially used and various parts of the hat can be made from different mesh fabrics or with controlled shrinkage or stretching by dies during the heat-activation to impart several different degrees of permeability to different portions of the hat. Thus, it may be desirable to have the top of low permeability to prevent easy passage of rain therethrough while at the same time the side wall may have great permeability to provide adequate ventilation while the brim may again be of low permeability to reduce the passage of the sun's rays.

Figure 2 shows a finished man's hat having a high degree of air permeability throughout the brim and crown portions 6 and 7 respectively.

Figure 4:
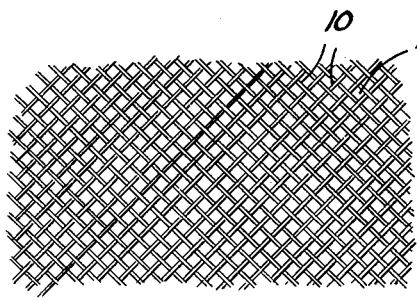
Figure 4 is a view illustrating on somewhat enlarged scale the open mesh of a representative fabric.
Figure 3:
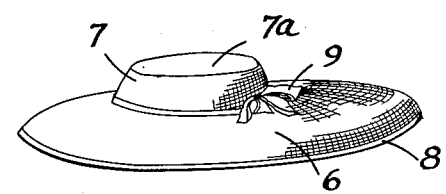
Figure 3 illustrates a woman's hat made in accordance with the invention.

The brim may be turned back at 8 and activated with heat and pressure to stiffen the edge thereof. A ribbon band 9 may be provided on the outside and a sweat band (not shown) of conventional construction may be provided on the inside. Figure 3 illustrates a woman's hat in which the brim 6 is turned back at 8 and the crown 7 has a somewhat concave top 7a. Again a decorative ribbon 9 may be provided. Figure 4 illustrates in actual size a representative fabric comprising the yarns 10 and the large interstices 11. Fabrics having even greater openness may be employed and, as stated above, the air permeability can be preselected with respect to each of the various portions of the hat as desired by controlling the extent of heat activation and/or shrinkage with accompanying reduction in size of the interstices at the respective portions.

While preferred embodiments of the invention have been disclosed, it is to be understood that changes and variations may be made in it without departing from the spirit and scope of the invention as defined by the appended claims.

I claim:

1. A hat formed from an open-mesh textile fabric comprising yarns containing stretched resin fibers, substantially all of said yarns being activated to a partially shrunk condition, said hat being characterized by resilient flexibility in conjunction with durable shape-retention and restorability as a result of the shrinkage of the fibers therein and having some area characterized by a high degree of air permeability and some area of lesser air permeability.

2. The hat of claim 1 in which the fibers are formed of a copolymer of vinyl chloride and vinyl acetate.

3. The hat of claim 2 in which at least part of the copolymer fibers are bonded to adjoining fibers.

4. A hat in accordance with claim 3 having a brim of low permeability to reduce the passage of the sun's rays therethrough.

5. A hat in accordance with claim 4 having a side wall of high permeability to provide ventilation.

WILLIAM G. LUTTGE.

REFERENCES CITED

The following references are of record in the file of this patent:

UNITED STATES PATENTS

| Number | Name | Date |
|---|---|---|
| 2,047,230 | Schneider | July 14, 1936 |
| 2,257,018 | White | Sept. 23, 1941 |
| 2,356,948 | Reed | Aug. 29, 1944 |